United States Patent
Chen et al.

(10) Patent No.: US 11,516,822 B2
(45) Date of Patent: Nov. 29, 2022

(54) WI-FI AND UWB COEXISTENCE SCHEMES

(71) Applicant: Apple Inc., Cupertino, CA (US)

(72) Inventors: Camille Chen, Cupertino, CA (US); Akshay Tumkur Rajshekhar, Sunnyvale, CA (US); Arjun Dheer, Milpitas, CA (US); Gordon Kin, Sunnyvale, CA (US); Sanjay Mani, San Jose, CA (US); Yang Yu, Redwood City, CA (US); Tahir Shamim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 450 days.

(21) Appl. No.: 16/565,753

(22) Filed: Sep. 10, 2019

(65) Prior Publication Data

US 2021/0076396 A1 Mar. 11, 2021

(51) Int. Cl.
*H04W 72/12* (2009.01)
*H04W 88/06* (2009.01)

(52) U.S. Cl.
CPC ... *H04W 72/1215* (2013.01); *H04W 72/1231* (2013.01); *H04W 72/1268* (2013.01); *H04W 88/06* (2013.01)

(58) Field of Classification Search
CPC ......... H04W 72/1215; H04W 72/1231; H04W 72/1268; H04W 88/06; H04W 16/14; H04W 16/04; H04W 16/10; H04W 72/044; H04W 72/1257; H04W 80/08
See application file for complete search history.

(56) References Cited

U.S. PATENT DOCUMENTS

| | | | |
|---|---|---|---|
| 8,208,939 B2 | 6/2012 | Aljadeff et al. | |
| 8,498,574 B2 | 7/2013 | Beninghaus et al. | |
| 8,619,750 B2 | 12/2013 | Wenham et al. | |
| 8,983,380 B2 | 3/2015 | Wang et al. | |
| 9,155,127 B1 | 10/2015 | de la Broise et al. | |
| 10,382,075 B1* | 8/2019 | Arool Emmanuel | H04B 1/0475 |
| 2017/0086251 A1* | 3/2017 | Valliappan | H04L 43/106 |
| 2021/0120555 A1* | 4/2021 | Badic | H04W 16/14 |

* cited by examiner

*Primary Examiner* — Kibrom T Hailu
(74) *Attorney, Agent, or Firm* — Kowert, Hood, Munyon, Rankin & Goetzel, P.C.

(57) ABSTRACT

Methods and apparatuses are presented to facilitate coexistence between multiple wireless communication protocols implemented by a wireless communication device, using a shared antenna, e.g., due to limitations resulting from a small form factor of the wireless communication device. The wireless communication device may determine whether communications according to a second protocol are causing performance of communications according to a first protocol to fall below a threshold level. If so, the wireless communication device may operate in a mode that favors communications according to the first protocol. If not, the wireless communication device may operate in a mode that favors communications according to the second protocol. For example, the mode that favors communications according to the first protocol may include temporarily implementing operations to remedy the poor performance of the communications according to the first, e.g., periodically, until the performance of the communications according to the first protocol recovers.

20 Claims, 6 Drawing Sheets

WI-FI AND UWB COEXISTENCE SCHEMES

TECHNICAL FIELD

The present application relates to wireless communication, including to techniques for coexistence of multiple radio access technologies using a shared antenna for wireless communication.

DESCRIPTION OF THE RELATED ART

Wireless communication systems are rapidly growing in usage. Further, wireless communication technology has evolved from voice-only communications to also include the transmission of data, such as Internet and multimedia content, precise ranging and location, etc.

Mobile electronic devices may take the form of smart phones or tablets that a user typically carries. Wearable devices are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

Additionally, there exist numerous different wireless communication technologies (also referred to as radio access technologies (RATs)) and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH', etc. In some implementations, multiple wireless communication technologies may share certain resources, such as an antenna, frequency space, etc. For example, ultra wideband (UWB) communications may utilize frequency ranges close to or overlapping with (or experiencing harmonics or other noise from) those used by Wi-Fi, which may lead to interference and congestion of the communication medium.

Additionally, this proximity of frequency may lead to wireless device designs in which a UWB radio may share one or more antennas with a Wi-Fi radio. In some scenarios, Bluetooth and/or various cellular communication modes, such as LTE in Unlicensed spectrum (LTE-U), Licensed Assisted Access (LAA), and NR-U may also operate within the shared frequency range and/or share an antenna with Wi-Fi and/or UWB radios.

Each new wireless communication technology or mode that is designed to operate within a frequency band already utilized by another technology may further exacerbate these problems. Accordingly, improvements in the field are desired to allow improved coexistence of various wireless communication standards operating with shared resources.

SUMMARY

Embodiments are presented herein of, inter alia, systems, apparatuses, and methods for performing techniques for coexistence of multiple radio access technologies (RATs) with shared resources for wireless communication, such as a shared antenna, a shared frequency range, etc. According to the techniques described herein, a wireless communication device may utilize communication protocols according to multiple RATs utilizing the shared resources, in a manner that reduces or avoids interference and/or collisions.

A wireless communication device is presented, which may include a first radio, configured to communicate according to a first (e.g., Wi-Fi) protocol, a second radio, configured to communicate according to a second (e.g., UWB) protocol, a shared antenna coupled to the first radio and the second radio, and at least one processor configured to cause the wireless communication device to perform certain operations. Specifically, the wireless communication device may determine that the first radio and the second radio are each configured to perform communications via the shared antenna, wherein only one of the first radio or the second radio may perform communications via the shared antenna at a given time. The wireless communication device may also determine whether communications according to the UWB protocol are causing performance of communications according to the Wi-Fi protocol to fall below a threshold level. In response to determining that communications according to the UWB protocol are not causing performance of communications according to the Wi-Fi protocol to fall below the threshold level, the wireless communication device may operate in a mode that favors communications according to the UWB protocol. In response to determining that communications according to the UWB protocol are causing performance of communications according to the Wi-Fi protocol to fall below the threshold level, the wireless communication device may operate in a mode that favors communications according to the Wi-Fi protocol.

In some scenarios, operating in the mode that favors communications according to the Wi-Fi protocol may include preventing communications according to the UWB protocol during one or more periods of time.

In some scenarios, operating in the mode that favors communications according to the Wi-Fi protocol may include alternating between periods during which use of the shared antenna by the second radio is prevented, and periods during which use of the shared antenna by the second radio is allowed.

In some scenarios, operating in the mode that favors communications according to the UWB protocol may include allowing communications according to the UWB protocol to interrupt communications according to the Wi-Fi protocol.

In some scenarios, determining that communications according to the UWB protocol are causing performance of communications according to the Wi-Fi protocol to fall below a threshold level may include at least one of determining that a data rate of communications according to the Wi-Fi protocol fails to meet a first performance threshold or determining that a latency metric of communications according to the Wi-Fi protocol meets a second performance threshold. In some scenarios, determining that communications according to the UWB protocol are causing performance of communications according to the Wi-Fi protocol to fall below a threshold level may further include: determining that a duty cycle of the communications according to the UWB protocol meets a third performance threshold and/or determining that a signal quality metric of the communications according to the first RAT meets a fourth performance threshold.

In some scenarios, while operating in the mode that favors communications according to the Wi-Fi protocol, the wireless communication device may determine that the data rate of communications according to the Wi-Fi protocol meets a fifth performance threshold. In response, the wireless communication device may operate in the mode that favors communications according to the UWB protocol.

In some scenarios, in response to determining that the first radio and the second radio are each configured to perform communications via the shared antenna, the wireless communication device may disable packet aggregation by the first radio.

In some scenarios, in response to determining that the first radio and the second radio are each configured to perform communications via the shared antenna, the wireless communication device may disable an OFDMA uplink mode of the first radio.

A method is presented for operating a wireless communication device using a first radio access technology (RAT) and a second RAT. The wireless communication device may determine that a first radio of the wireless communication device and a second radio of the wireless communication device are each configured to perform communications via a shared antenna of the wireless communication device. The first radio may be configured to perform communications according to the first RAT, and the second radio may be configured to perform communications according to the second RAT, and only one of the first radio or the second radio may perform communications via the shared antenna at one time. The wireless communication device may determine that communications according to the first RAT fail to meet predetermined performance criteria. The wireless communication device may further determine that one or more metrics indicate that communications according to the second RAT are contributing to the failure of the communications according to the first RAT to meet the predetermined performance criteria. In response to determining that the one or more metrics indicate that communications according to the second RAT are contributing to the failure of the communications according to the first RAT to meet predetermined performance criteria, the wireless communication device may prevent communications according to the second RAT during one or more periods of time.

In some scenarios, preventing the communications according to the second RAT for one or more periods of time may include implementing a plurality of remediation periods, during which communications according to the second RAT are prevented, wherein a remediation period is followed by a maintenance period (e.g., a UWB maintenance period), during which communications according to the second RAT are allowed.

In some scenarios, determining that communications according to the first RAT fail to meet predetermined performance criteria may include at least one of: determining that a data rate of the communications according to the first RAT fails to meet a first performance threshold; or determining that a latency metric of the communications according to the first RAT meet a second performance threshold.

In some scenarios, determining that one or more metrics indicate that communications according to the second RAT are contributing to the failure of the communications according to the first RAT to meet predetermined performance criteria may include: determining that a duty cycle of the communications according to the second RAT meets a third performance threshold and/or determining that a signal quality metric of the communications according to the first RAT meets a fourth performance threshold.

In some scenarios, in response to determining that the first radio of the wireless communication device and the second radio of the wireless communication device are each configured to perform communications via the shared antenna, the wireless communication device may disable packet aggregation by the first radio and/or may disable an OFDMA uplink mode of the first radio.

A wireless communication device is presented, which may include a first radio, configured to communicate according to a first RAT (e.g., Wi-Fi), a second radio, configured to communicate according to a second RAT (e.g., UWB), and at least one processor configured to cause the wireless communication device to perform certain operations. Specifically, the wireless communication device may determine that the first radio and the second radio are each configured to perform communications within a shared frequency range; and determine that communications according to the first RAT fail to meet predetermined performance criteria, and that one or more metrics indicate that communications according to the second RAT are contributing to the failure of the communications according to the first RAT to meet the predetermined performance criteria. In response to determining that the one or more metrics indicate that communications according to the second RAT are contributing to the failure of the communications according to the first RAT to meet predetermined performance criteria, the wireless communication device may prevent communications according to the second RAT during one or more periods of time. In response to determining that the one or more metrics do not indicate that communications according to the second RAT are contributing to the failure of the communications according to the first RAT to meet predetermined performance criteria, the wireless communication device may prioritize communications according to the first RAT over communications according to the second RAT.

In some implementations, preventing the communications according to the second RAT for one or more periods of time may include implementing a plurality of block periods, during which communications according to the second RAT are prevented, wherein each block period is followed by a grant period, during which communications according to the second RAT are allowed.

In some implementations, determining that communications according to the first RAT fail to meet predetermined performance criteria may include at least one of: determining that a data rate of the communications according to the first RAT fail to meet a first performance threshold and/or determining that a latency metric of the communications according to the first RAT meet a second performance threshold.

In some implementations, determining that one or more metrics indicate that communications according to the second RAT are contributing to the failure of the communications according to the first RAT to meet predetermined performance criteria may include determining that a duty cycle of the communications according to the second RAT meets a third performance threshold; and determining that a signal quality metric of the communications according to the first RAT meets a fourth performance threshold. In some implementations, in response to determining that the first radio of the wireless communication device and the second radio of the wireless communication device are each configured to perform communications within the shared frequency range, the wireless communication device may perform at least one of: disabling packet aggregation by the first radio; or disabling an OFDMA uplink mode of the first radio.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
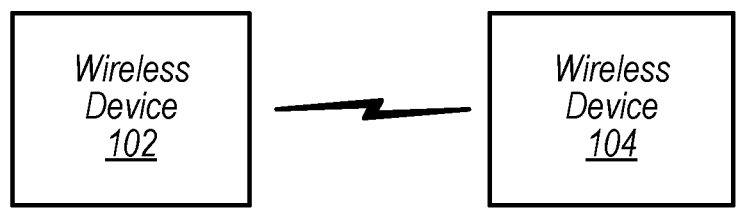
FIG. 1 illustrates an example wireless communication system, according to various exemplary embodiments described herein.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Incorporation by Reference

Various details of example UWB communication protocols are disclosed in IEEE 802.15.4-2015, which is hereby incorporated by reference as though disclosed herein in its entirety.

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB" or "gNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

FIG. 1—Wireless Communication System

FIG. 1 illustrates an exemplary (and simplified) wireless communication system 100 in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device 104. The first wireless device 102 and the second wireless device 104 may communicate wirelessly using any of a variety of wireless communication techniques.

As one possibility, the first wireless device 102 and the second wireless device 104 may communicate using techniques based on WPAN or WLAN wireless communication, such as 802.11/Wi-Fi. One or both of the wireless device 102 and the wireless device 104 may also be capable of communicating via one or more additional wireless communication protocols, such as UWB as described herein, and/or any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102, 104 may be any of a variety of types of wireless device. As one possibility, one or more of the wireless devices 102, 104 may be a substantially portable wireless user equipment (UE) device, such as a smart phone, hand-held device, a wearable device, a tablet, a motor vehicle, or virtually any type of mobile wireless device. As another possibility, one or more of the wireless devices 102, 104 may be a substantially stationary device, such as a set top box, media player (e.g., an audio or audiovisual device), gaming console, desktop computer, appliance, door, base station, access point, or any of a variety of other types of device.

Each of the wireless devices 102, 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102, 104 may include one or more antennas for communicating using one or more wireless communication protocols. In some cases, one or more parts of a receive and/or transmit chain may be shared between multiple wireless communication standards. For example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using either of LTE or CDMA2000 1×RTT, and separate radios for communicating using each of UWB, Wi-Fi, and/or Bluetooth. Other configurations are also possible.

As previously noted, aspects of this disclosure may be implemented in conjunction with the wireless communication system of FIG. 1. For example, the wireless devices 102, 104 may communicate using one or more coexistence techniques or features described subsequently herein with respect to FIGS. 5-7. By utilizing such techniques (and/or other techniques described herein), the wireless device(s) may (at least according to some embodiments) be able to reduce interference and/or congestion, while communicating according to a plurality of wireless communication technologies.

Figure 2:
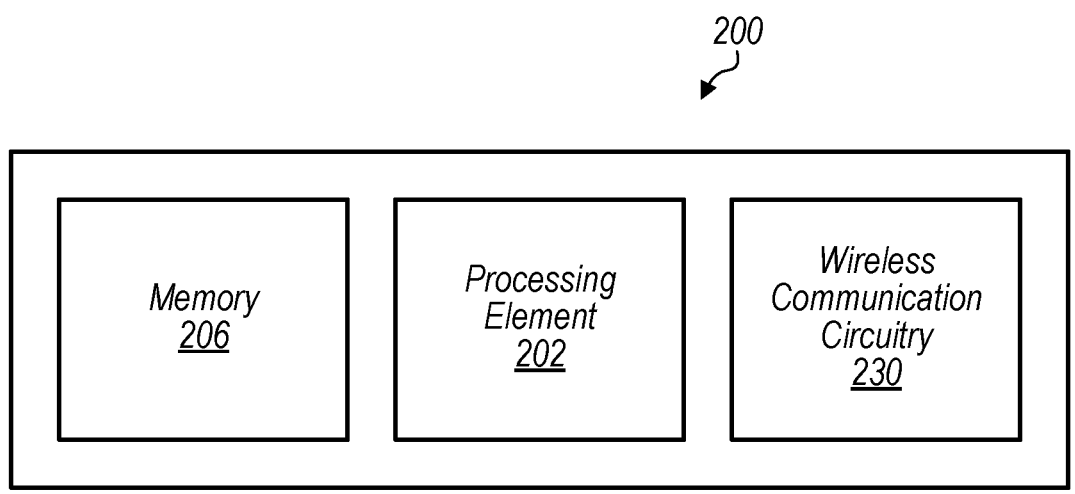
FIGS. 2-3 are block diagrams illustrating example wireless devices, according to various exemplary embodiments described herein.
Figure 3:
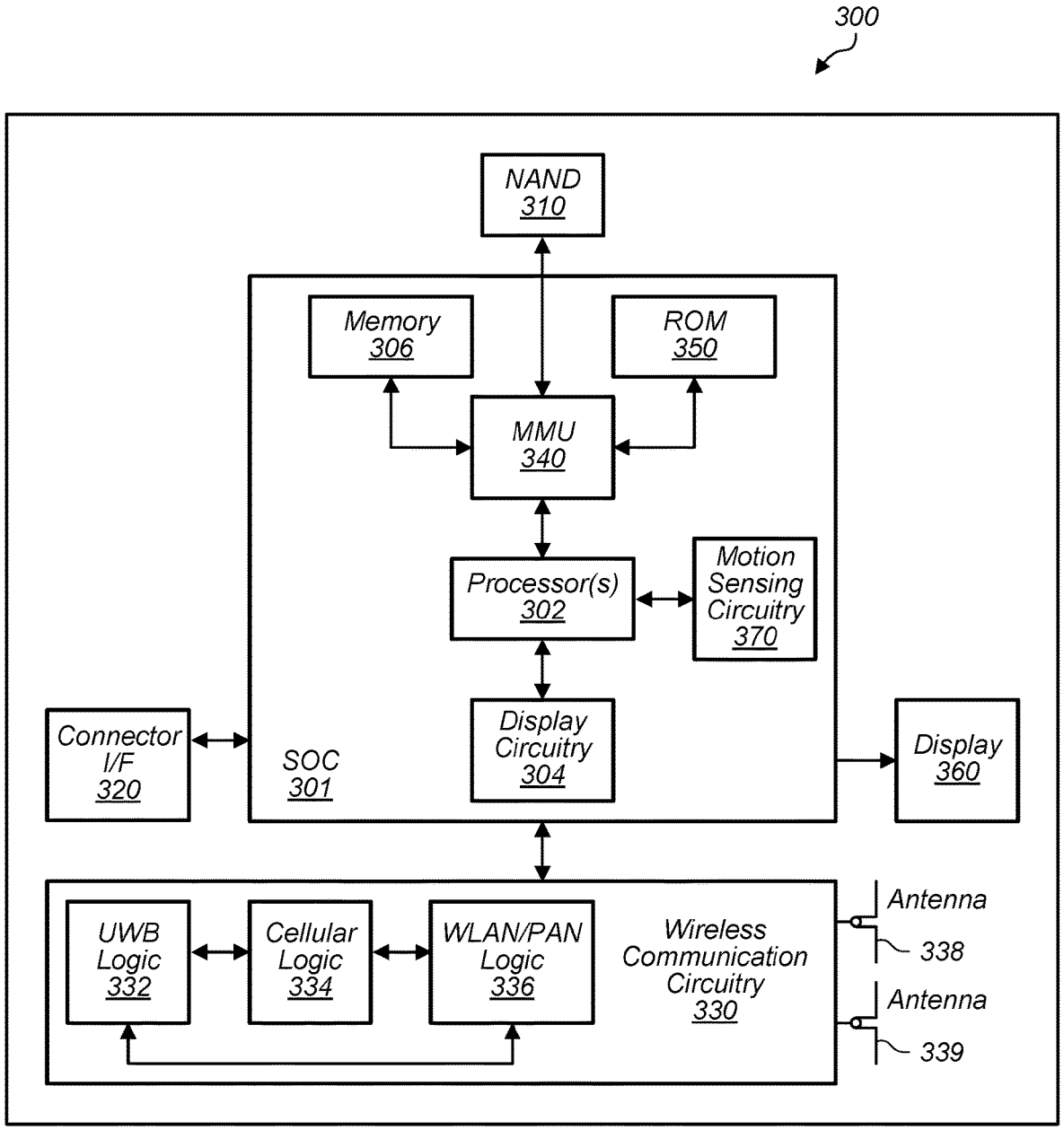

FIGS. 2-3—Exemplary Device Block Diagrams

FIG. 2 illustrates an exemplary wireless device 200 that may be configured for use in conjunction with various aspects of the present disclosure. For example, the device 200 may be an example of the wireless device 102 or the wireless device 104. The device 200 may be any of a variety of types of device and may be configured to perform any of a variety of types of functionality. The device 200 may be a substantially portable device or may be a substantially stationary device, potentially including any of a variety of types of device. The device 200 may be configured to perform one or more wireless communication coexistence techniques or features, such as any of the techniques or features illustrated and/or described subsequently herein with respect to any or all of FIGS. 5-7.

As shown, the device 200 may include a processing element 202. The processing element may include or be coupled to one or more memory elements. For example, the device 200 may include one or more memory media (e.g., memory 206), which may include any of a variety of types of memory and may serve any of a variety of functions. For example, memory 206 could be RAM serving as a system memory for processing element 202. Other types and functions are also possible.

Additionally, the device 200 may include wireless communication circuitry 230. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 230 may include its own processing element (e.g., a baseband processor and/or control processor), e.g., in addition to the processing element 202. For example, the processing element 202 might be (or include) an 'application processor' whose primary function may be to support application layer operations in the device 200, while the wireless communication circuitry 230 might include a 'baseband processor' whose primary function may be to support baseband layer operations (e.g., to facilitate wireless communication between the device 200 and other devices) in the device 200. In other words, in some cases the device 200 may include multiple processing elements (e.g., may be a multi-processor device). Other configurations (e.g., instead of or in addition to an application processor/baseband processor configuration) utilizing a multi-processor architecture are also possible.

The device 200 may additionally include any of a variety of other components (not shown) for implementing device functionality, depending on the intended functionality of the device 200, which may include further processing and/or memory elements (e.g., audio processing circuitry), one or more power supply elements (which may rely on battery power and/or an external power source), user interface elements (e.g., display, speaker, microphone, camera, keyboard, mouse, touchscreen, etc.), sensors, and/or any of various other components.

The components of the device 200, such as processing element 202, memory 206, and wireless communication circuitry 230, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 202, peripheral interfaces for communication with peripheral components within or external to device 200, etc.) may also be provided as part of device 200.

FIG. 3 illustrates one possible block diagram of a wireless device 300, which may be one possible exemplary implementation of the device 200 illustrated in FIG. 2. As shown, the wireless device 300 may include a system on chip (SOC) 301, which may include portions for various purposes. For example, as shown, the SOC 301 may include processor(s)

302 which may execute program instructions for the wireless device 300, and display circuitry 304 which may perform graphics processing and provide display signals to the display 360. The SOC 301 may also include motion sensing circuitry 370 which may detect motion of the wireless device 300, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 301 may be coupled to various other circuits of the wireless device 300. For example, the wireless device 300 may include various types of memory (e.g., including NAND flash 310), a connector interface 320 (e.g., for coupling to a computer system, dock, charging station, etc.), the display 360, and wireless communication circuitry 330 (e.g., for UWB, LTE, LTE-A, CDMA2000, Bluetooth, Wi-Fi, NFC, GPS, etc.).

The wireless device 300 may include at least one antenna, and in some embodiments multiple antennas 338 and 339, for performing wireless communication with base stations and/or other devices. For example, the wireless device 300 may use antennas 338 and 339 to perform the wireless communication. In some implementations, each of the antennas 338 or 339 may include one or more antennas and/or one or more antenna arrays. As noted above, the wireless device 300 may in some embodiments be configured to communicate wirelessly using a plurality of wireless communication standards or radio access technologies (RATs).

The wireless communication circuitry 330 may include UWB Logic 332, Cellular Logic 334, and additional WLAN/PAN Logic 336. The UWB Logic 332 is for enabling the wireless device 300 to perform UWB communications, e.g., for wireless communications as described herein. The WLAN/PAN Logic 336 is for enabling the wireless device 300 to perform other WLAN and/or PAN communications, such as Wi-Fi and/or Bluetooth communications. In some scenarios, the WLAN/PAN Logic 336 main include distinct circuitry for performing communications according to distinct protocols, such as a first portion of circuitry for performing Wi-Fi communications and a second portion of circuitry for performing Bluetooth communications. In some scenarios, the WLAN/PAN Logic 336 main also, or alternatively, include shared circuitry for performing communications according to multiple protocols, such as both Wi-Fi and Bluetooth. The Cellular Logic 334 may be capable of performing cellular communication according to one or more cellular communication technologies. In some scenarios, each of the UWB Logic 332, the Cellular Logic 334, and the WLAN/PAN Logic 336, or some portion thereof may be referred to as a radio. For example, the UWB Logic 332 may be referred to as, or may include, a UWB radio; the Cellular Logic 334 may be referred to as, or may include, a cellular radio; and/or the WLAN/PAN Logic 336 may be referred to as, or may include, one or more of a WLAN radio, a PAN radio, a Wi-Fi radio, a BT radio, etc.

Note that in some cases, one or more of the UWB Logic 332, the Cellular Logic 334, or the WLAN/PAN Logic 336 may include its own processing element (e.g., a baseband processor and/or control processor), e.g., in addition to the processor(s) 302. For example, the processor(s) 302 might be (or include) an 'application processor' whose primary function may be to support application layer operations in the device 300, while one or more of the UWB Logic 332, the Cellular Logic 334, or the WLAN/PAN Logic 336 may include a 'baseband processor' whose primary function may be to support baseband layer operations for the applicable RAT.

As described herein, wireless device 300 may include hardware and software components for implementing embodiments of this disclosure. For example, one or more components of the wireless communication circuitry 330 (e.g., UWB Logic 332 and/or WLAN/PAN Logic 336) of the wireless device 300 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
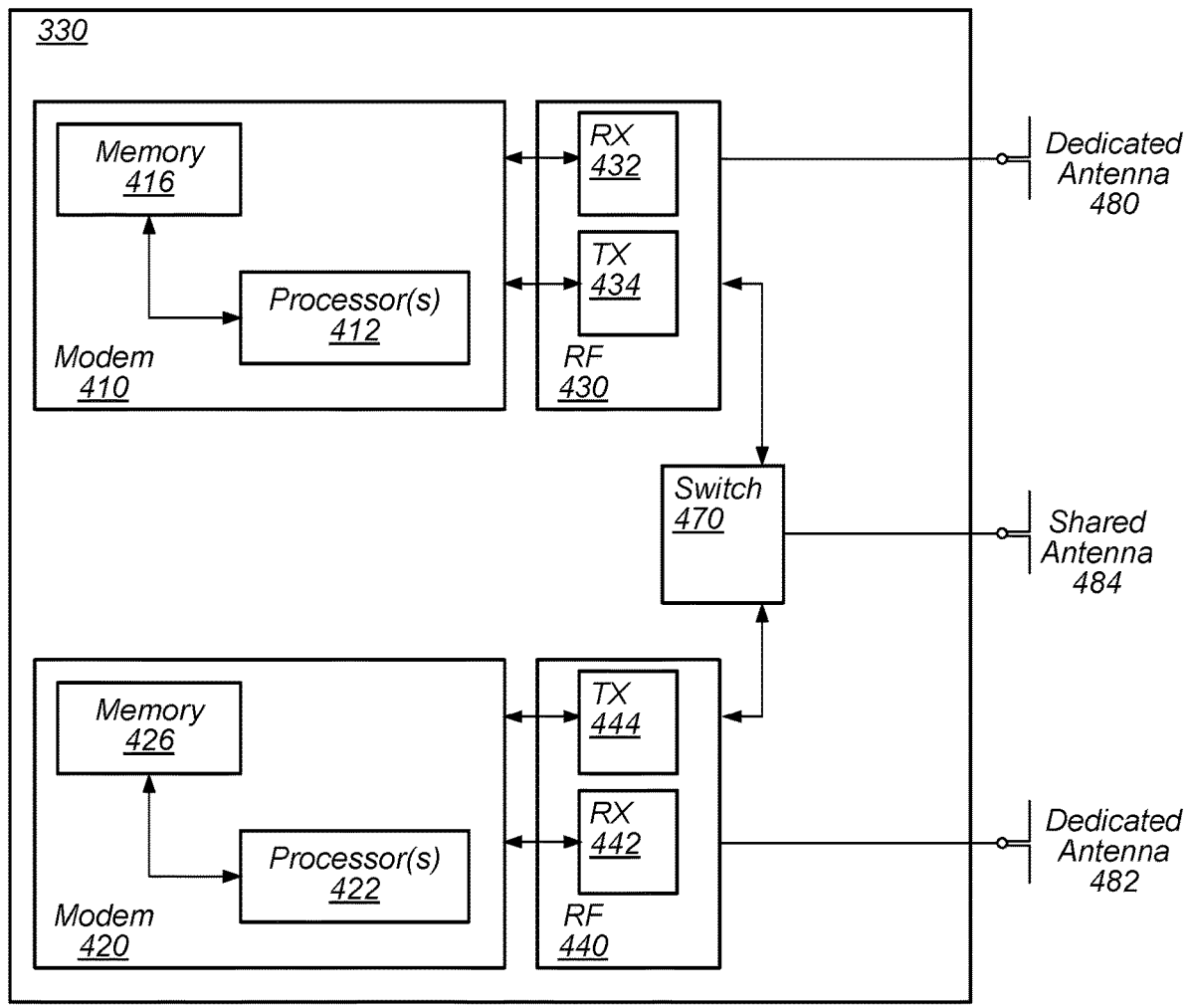
FIG. 4 illustrates an example block diagram of wireless communication circuitry, according to some embodiments.

FIG. 4—Block Diagram of Wireless Communication Circuitry

FIG. 4 illustrates an example simplified block diagram of wireless communication circuitry, according to some embodiments. It is noted that the block diagram of the wireless communication circuitry of FIG. 4 is only one example of a possible wireless communication circuit; other circuits, such as circuits including or coupled to sufficient antennas for different RATs to perform communication activities using separate antennas, or circuits including or coupled to fewer antennas, e.g., that may be shared among multiple RATs, are also possible. According to some embodiments, wireless communication circuitry 330 may be included in a communication device, such as communication device 102 described above.

The wireless communication circuitry 330 may couple (e.g., communicatively; directly or indirectly) to one or more antennas, such as antennas 480, 482, and 484, as shown, which may be equivalent to, or included in the set of antennas 338 and 339 of FIG. 3. In some embodiments, wireless communication circuitry 330 may include dedicated receive chains (including and/or coupled to (e.g., communicatively; directly or indirectly) dedicated processors and/or radios) for multiple RATs (e.g., a first receive chain for UWB and a second receive chain for Wi-Fi). For example, as shown in FIG. 4, wireless communication circuitry 330 may include a first modem 410 and a second modem 420. The first modem 410 may be configured for communications according to a first RAT, e.g., such as UWB, and the second modem 420 may be configured for communications according to a second RAT, e.g., such as Wi-Fi.

As shown, the first modem 410 may include one or more processors 412 and a memory 416 in communication with processors 412. Modem 410 may be in communication with a radio frequency (RF) front end 430. RF front end 430 may include circuitry for transmitting and receiving radio signals. For example, RF front end 430 may include receive circuitry (RX) 432 and transmit circuitry (TX) 434. In some embodiments, RF front end 430 may be communicatively coupled to dedicated antenna 480, which may be used exclusively by the modem 410. In some scenarios, dedicated antenna 480 may include a plurality of antennas, or one or more antenna arrays.

Similarly, the second modem 420 may include one or more processors 422 and a memory 426 in communication with processors 422. Modem 420 may be in communication with an RF front end 440. RF front end 440 may include circuitry for transmitting and receiving radio signals. For example, RF front end 440 may include receive circuitry 442 and transmit circuitry 444. In some embodiments, RF front end 440 may be communicatively coupled to dedicated antenna 482, which may be used exclusively by the modem 420. In some scenarios, dedicated antenna 482 may include a plurality of antennas, or one or more antenna arrays.

In some embodiments, a switch 470 may couple RF front end 430 to shared antenna 484. In some scenarios, shared antenna 484 may include a plurality of antennas, or one or more antenna arrays. In addition, switch 470 may couple RF front end 440 to shared antenna 484. Thus, when wireless communication circuitry 330 receives instructions to transmit and/or receive according to the first RAT (e.g., as supported via the first modem 410), switch 470 may be switched to a first state that allows the first modem 410 to transmit and/or signals according to the first RAT (e.g., via a communication chain that includes RF front end 430 and shared antenna 484). Similarly, when wireless communication circuitry 330 receives instructions to transmit and/or receive according to the second RAT (e.g., as supported via the second modem 420), switch 470 may be switched to a second state that allows the second modem 420 to transmit and/or signals according to the second RAT (e.g., via a communication chain that includes RF front end 440 and shared antenna 484). In some scenarios, wireless communication circuitry 330 may receive instructions to transmit or receive according to both the first RAT (e.g., as supported via modem 410) and the second RAT (e.g., as supported via modem 420) simultaneously. In such scenarios, switch 470 may be switched to a third state that allows modem 410 to transmit and/or signals according to the first RAT (e.g., via a communication chain that includes RF front end 430 and shared antenna 484) and modem 420 to transmit signals according to the second RAT (e.g., via a communication chain that includes RF front end 440 and shared antenna 484). In other scenarios, simultaneous transmission of signals according to both RATs via the shared antenna 484 may not be allowed.

In some embodiments, the RF front end 430 may select between transmitting via the shared antenna 484 or the dedicated antenna 480. Similarly, the RF front end 440 may select between transmitting via the shared antenna 484 or the dedicated antenna 482. Such selections may be based on a variety of factors, such as transmission frequency of the communications, ongoing use of the shared antenna 484 by the other RF front end, antenna diversity considerations, and/or other operational considerations, e.g., as discussed below.

As described herein, the first modem 410 and/or the second modem 420 may include hardware and software components for implementing any of the various features and techniques described herein. The processors 412, 422 may be configured to implement part or all of the features described herein, e.g., by executing program instructions stored on a memory medium (e.g., a non-transitory computer-readable memory medium). Alternatively (or in addition), processors 412, 422 may be configured as a programmable hardware element, such as an FPGA (Field Programmable Gate Array), or as an ASIC (Application Specific Integrated Circuit). Alternatively (or in addition) the processors 412, 422, in conjunction with one or more of the other components 430, 432, 434, 440, 442, 444, 470, 480, 482, and 484 may be configured to implement part or all of the features described herein.

In addition, as described herein, processors 412, 422 may include one or more processing elements. Thus, processors 412, 422 may include one or more integrated circuits (ICs) that are configured to perform the functions of processors 412, 422. In addition, each integrated circuit may include circuitry (e.g., first circuitry, second circuitry, etc.) configured to perform the functions of processors 412, 422.

In some embodiments, the wireless communication circuitry 330 may couple to only a subset of the antennas 480, 482, and 484. For example, in some scenarios, dedicated antenna 480 and/or dedicated antenna 482 may be omitted. In some embodiments, the wireless communication circuitry 330 may couple to only the shared antenna 484.

UWB Coexistence Considerations

UWB communication, e.g., as described in IEEE 802.15.4-2015, incorporated by reference above, which is sometimes also referred to as pulse radio, is capable of providing wireless communications at low transmit power across large bandwidths (e.g., approximately 500 MHz or more), with precise timing. This technology is therefore well suited for short-range communications in which multi-path interference is a concern. For example, UWB communications are well suited for indoor ranging and positioning applications.

However, integrating UWB communication capabilities into wireless communication devices, such as the wireless devices 102 and 104, may be difficult for a variety of reasons. For example, UWB communication has currently been defined by IEEE for operation within any of a number of channels, with channel 5 (approximately 6.2 GHz-6.7 GHz) and channel 9 (approximately 7.75 GHz-8.25 GHz) being commonly approved for use in many jurisdictions. However, use of certain channels, such as channel 5, may lead to interference with other radio access technologies (RATs), such as Wi-Fi. For example, Wi-Fi currently supports operations within the 5 GHz band (approximately 5.15 GHz-5.925 GHz), and may support operations within the 6-7 GHz band (e.g., up to 7.125 GHz). Thus, UWB communications within channel 5 (as well as other channels, such as channels 6-8) may share a close or overlapping frequency range with Wi-Fi communications, which may pose a significant risk of interference, e.g., due to direct overlap in operational frequencies or due to harmonics, noise spurs, etc. within non-overlapping frequency ranges. Thus, in some scenarios, it may be advantageous to operate UWB in channel 9, to avoid or respond to such interference conditions with Wi-Fi. In some settings, a UWB radio may be configured to operate using channel diversity utilizing both channel 5 and channel 9, to improve robustness of communications.

However, use of channel 9 has been restricted by regulation in some jurisdictions. For example, applicable regulations in Russia limit maximum effective (or equivalent) isotropic radiated power (EIRP) within channel 9 to approximately −65 dBm/MHz-approximately 18 dB/MHz lower than the maximum EIRP defined for channel 5. With such a low cap on EIRP within channel 9, UWB communications within that channel may not have a useful spatial range. Other channels may be similarly capped, or barred altogether. As another example, regulations issued by the United States currently bar use of channel 9 in certain scenarios, such as on ships international waters. Thus, in some jurisdictions, UWB communications may currently be effectively limited to channel 5. Furthermore, even in jurisdictions without such limitations, Wi-Fi may soon expand into frequencies approaching channel 9, as noted above. Therefore, many scenarios exist, or will soon exist, in which UWB communications and Wi-Fi communications will operate in neighboring and/or overlapping frequency ranges.

Additionally, integrating antennas for multiple RATs into a small wireless device (e.g., a smartphone or wearable device) may involve additional difficulties due to size constraints. For example, a typical wireless device may include 6-8 or more antennas—e.g., dedicated or shared antennas for cellular communications (e.g., a 2×2 LTE MIMO array), Wi-Fi (e.g. a 2×2 MIMO array), GPS, BT, NFC, wireless charging, etc. Thus, integrating additional antennas for UWB communications may be challenging. In particular, UWB ranging applications may utilize 3 or more antennas, e.g., for measurement of angle of arrival (AoA) in the X, Y, and Z axes. Some form factors may not provide sufficient space to allow desired levels of isolation, spatial diversity, etc. for this number of dedicated antennas. Thus, antenna sharing may be desirable (or necessary) in some applications.

In light of the neighboring or overlapping operational frequency ranges of UWB channel 5 (and/or other channels) and Wi-Fi operating in the 5-6 GHz band, antenna sharing between UWB and Wi-Fi communications may be advantageous. To allow such antenna sharing and/or to avoid inter-RAT interference within the neighboring or overlapping frequency ranges, a UWB radio and a Wi-Fi radio may, in some scenarios, implement coexistence protocols, such as operating in one or more timesharing modes.

However, UWB communications have certain characteristics that introduce complications into coexistence schemes such as timesharing. For example, many UWB applications involve synchronized timing for transmitted and received packets for multiple users. For example, to operate UWB communications with high performance and low power consumption, the UWB radio may operate according to a strict synchronization schedule, so as to transmit and/or receive in a wake state during narrow time windows, while remaining in a sleep state at other times. Additionally, many UWB applications, such as ranging, may utilize short packets (e.g., a few hundreds of microseconds or less) at frequent intervals (e.g., a few milliseconds or less), with very low tolerance for latency. Such frequent transmissions may conflict with other RATs, such as Wi-Fi, which may commonly transmit and/or receive signals having a duration longer than the UWB transmission intervals.

Another challenge arises from constraints in typical current UWB hardware with regard to foreknowledge of upcoming transmissions. For example, in current procedures for facilitating coexistence of Wi-Fi with BT, a BT radio may notify the Wi-Fi radio of upcoming BT communications prior to taking control of the communication medium and/or antenna(s). Specifically, the Wi-Fi radio may receive sufficient warning as to allow the Wi-Fi radio to notify an access point (AP) and/or other neighboring devices that the Wi-Fi radio will be temporarily unavailable during the BT communications, e.g., by sending a clear-to-send (CTS) message, or through other known procedures. Similar notice may be provided by an LTE radio to facilitate coexistence between LTE and Wi-Fi. However, current UWB hardware typically may not have sufficient foreknowledge of upcoming UWB communications as to provide such warning to the Wi-Fi radio. Thus, traditional coexistence schemes, such as those used for BT or LTE, may not be applicable for facilitating coexistence between UWB and Wi-Fi.

Figure 5:
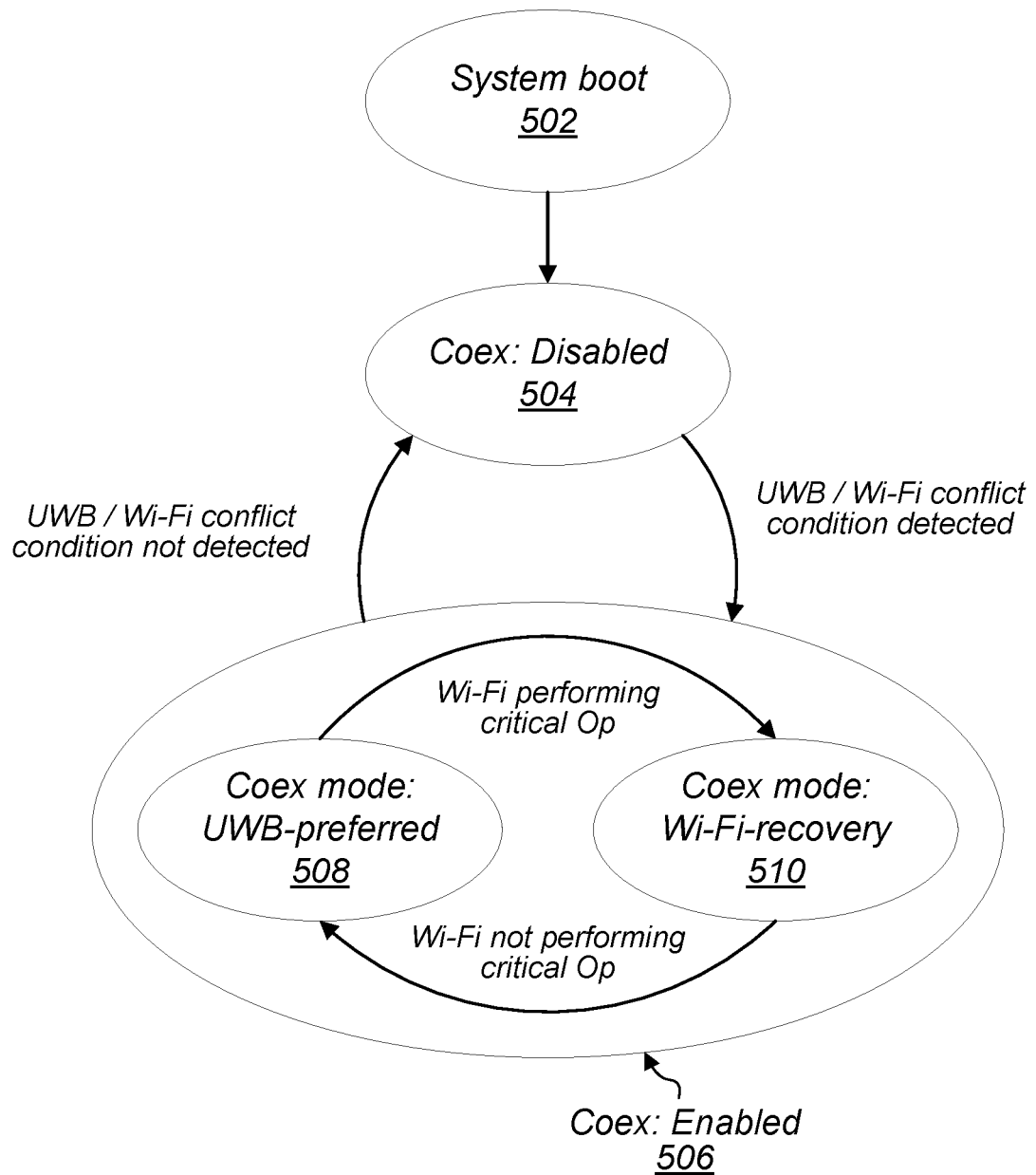
FIG. 5 illustrates an example state machine for implementing coexistence protocols, according to some embodiments.
Figure 6:
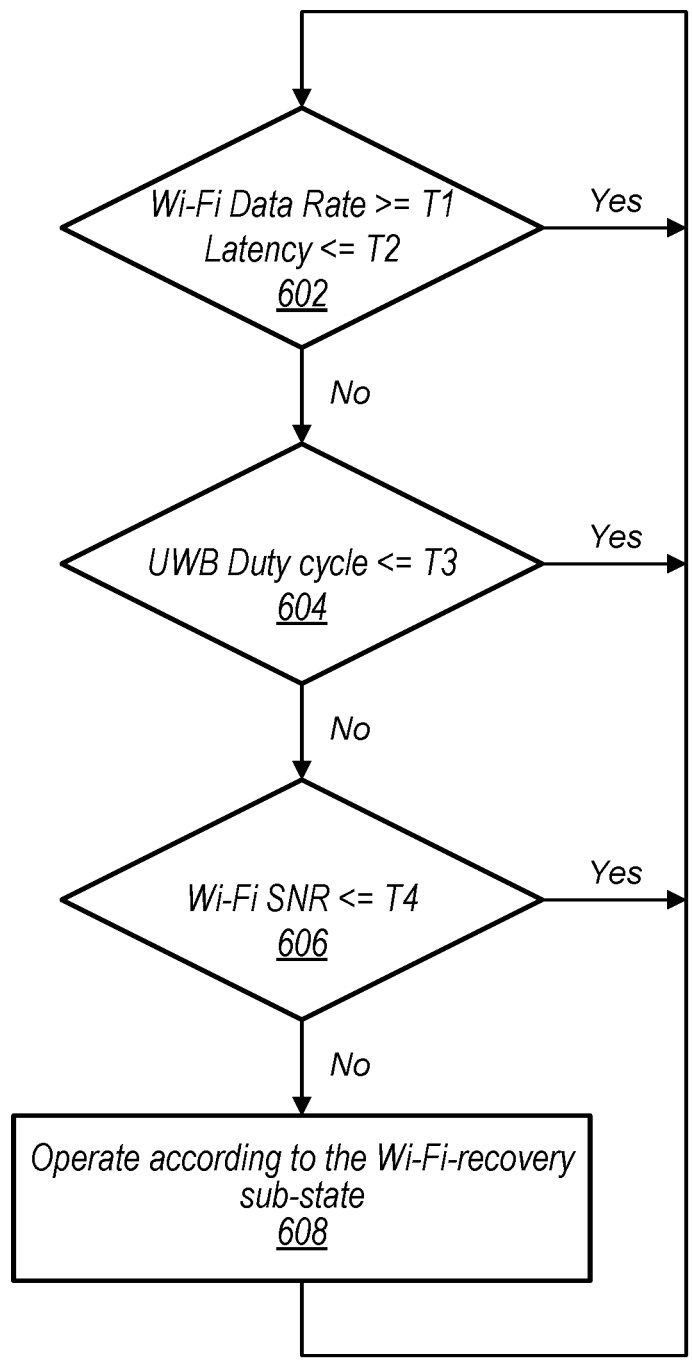
FIG. 6 illustrates an example flow diagram of one method of determining whether Wi-Fi communications have stalled, according to some embodiments.
Figure 7:
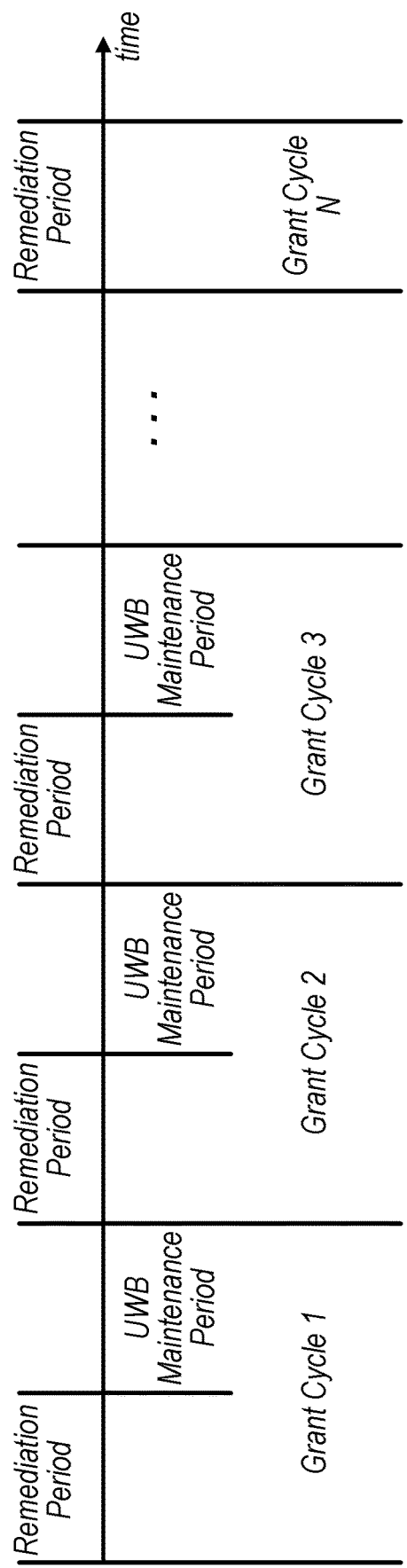
FIG. 7 shows a timing diagram illustrating operational states of a system over time, while the system is operating in a Wi-Fi-recovery sub-state, according to some embodiments.

FIGS. 5-7 UWB Coexistence

FIG. 5 illustrates an example state machine for implementing coexistence protocols, according to some embodiments. The state machine may be implemented by any appropriate system, such as a wireless device, e.g., the wireless device 102, or some portion thereof, such as by an application processor (e.g., processor(s) 302) or the wireless communication circuitry 330 (e.g., the UWB Logic 332 and/or the WLAN/PAN Logic 336). For example, in some scenarios, software executed by the UWB Logic 332 may communicate with software executed by the WLAN/PAN Logic 336 and/or software executed by the processor(s) 302, e.g., to share information regarding use cases, priority, schedules, operational states, etc. Each set of software may also communicate information such as coexistence state, policy, etc. to its respective firmware. The firmware may use such information to control the radio hardware in implementing coexistence policies. Communication between a UWB radio (e.g., the UWB Logic 332) and a Wi-Fi radio (e.g., the WLAN/PAN Logic 336) may be implemented in any of various ways, depending on the hardware and software used. For example, in some implementations each of the radios may pass information to the processor(s) 302, which may relay relevant information to the other radio. As another example, some implementations may include one or more general purpose input/output (GPIO) connections, system power management interfaces (SPMI), custom interfaces and/or other interfaces between the UWB radio and the Wi-Fi radio, to allow direct real-time communication.

According to the example of FIG. 5, the system may boot at 502. This system boot may include, e.g., powering on the wireless device 102, or powering on or activating the wireless communication circuitry 330 or other relevant components.

Upon system boot, the system may transition to a state 504, in which UWB coexistence protocols are disabled. Specifically, it may be noted that coexistence protocols may limit operation of one or more of the relevant RATs (e.g., UWB and/or Wi-Fi), and may also consume power and/or processing resources. Thus, it may be advantageous to disable such protocols when they are not needed. For example, UWB is most commonly utilized for specific applications, and is therefore unlikely to be used immediately upon system boot—e.g., prior to activation of such applications.

While the system operates within the coexistence disabled state 504, either or both of a Wi-Fi radio (e.g., including WLAN/PAN Logic 336) and a UWB radio (e.g., including UWB Logic 332) may operate without regard to operation of the other. For example, one or more of the radios may perform communications without determining whether the other radio is simultaneously performing communications and/or without making any adjustment to accommodate simultaneous communications by the other radio.

From the coexistence disabled state 504, the system may transition to a state 506, in which UWB coexistence protocols are enabled. This transition may occur in response to the system detecting one or more conditions that indicate that a communications conflict may occur between the UWB radio and the Wi-Fi radio. For example, detecting these conditions may include the system detecting both that the Wi-Fi radio is operating (or preparing to operate) in a particular frequency band (e.g., the 5-7 GHz band, or some particular portion thereof) and that the UWB radio is operating (or preparing to operate) in a conflicting channel, such as a channel that neighbors, overlaps with, or otherwise interferes with the particular frequency band (e.g., one or more of channels 5-8). As another example, detecting these conditions may include the system detecting that the UWB radio and the Wi-Fi radio are operating (or preparing to operate) in modes in which they will share one or more antennas (such as the antenna 339) and/or other communication hardware, e.g., wherein only one of the UWB radio or the Wi-Fi radio may use the one or more antennas at a given time.

From state 506, the system may transition back to state 504, e.g., in response to the system detecting conditions that indicate that a communications conflict will not occur between the UWB radio and the Wi-Fi radio. For example, detecting these conditions may include the system detecting either that the Wi-Fi radio is not operating in the particular frequency band, or that the UWB radio is not operating in a conflicting channel. As another example, detecting these conditions may include the system detecting that the UWB radio and/or the Wi-Fi radio has exited a mode in which the radios would share one or more antennas and/or other communication hardware. In some scenarios, these conditions may be in response to the Wi-Fi radio being turned off or transitioning to a different frequency band, such as the 2.4 GHz band. In some scenarios, these conditions may be in response to the UWB radio being turned off or transitioning to a different channel, such as channel 9.

While the system operates within the coexistence enabled state 506, one or more of the Wi-Fi radio and the UWB radio may consider current operations of the other when scheduling and/or performing its own communications. For example, one or more of the radios may forego scheduling or performing communications (or certain communications) concurrently with communications of the other radio.

More particularly, when operating within the coexistence enabled state 506, the system may perform any of various procedures to mitigate conflicts between UWB communications and Wi-Fi communications. For example, the system may enforce limits on Wi-Fi transmit power or other parameters to avoid conflicts with UWB communications. It should be noted that, in some implementations of Wi-Fi, such as certain modes defined for IEEE 802.11ax, an AP may dictate transmit power and/or other parameters for client devices operating with an OFDMA uplink. Therefore, in some implementations of the present system, the system may disable OFDMA uplink when operating in the coexistence enabled state 506, so as to avoid allowing the AP to dictate client parameters that may exacerbate conflicts between UWB communications and Wi-Fi communications. More generally, when operating in the coexistence enabled state 506, the system may disable or disallow any mode of the Wi-Fi radio that would allow a remote device (such as an AP) to control parameters of the Wi-Fi radio that are relevant to coexistence with UWB communications.

As another example, while operating within the coexistence enabled state 506, the system may modify packet aggregation policies of the Wi-Fi radio. In particular, as noted above, UWB communications sometimes transmit and/or receive frequent, brief communications, e.g., at regular intervals. In some implementations, the system may cause the Wi-Fi radio to disallow packet aggregation, or limit the aggregation size of Wi-Fi communications such that each Wi-Fi communication is shorter than the UWB communication interval, e.g., because larger Wi-Fi communications would be very likely to be interrupted by the regular UWB communications, leading to repeated Wi-Fi communication failures.

As another example, while operating within the coexistence enabled state 506, the system may implement channel diversity (e.g., using channel 5 and channel 9, or other channels) and/or antenna diversity (e.g., in implementations including multiple antenna options).

When operating within the coexistence enabled state 506, the system may operate in any of at least two sub-states. As illustrated in FIG. 5, the sub-states may include at least a UWB-preferred sub-state 508 and a Wi-Fi-recovery sub-state 510.

In some implementations, the system may begin in the UWB-preferred sub-state 508 upon transitioning to the coexistence enabled state 506. The UWB-preferred sub-state 508 may favor UWB operations over Wi-Fi operations. For example, while the system is operating in the UWB-preferred sub-state 508, the UWB radio may be granted access to the communication channel and/or to one or more shared antenna(s), such as the antenna(s) 339, upon request by the UWB radio, to transmit or receive a UWB communication. For example, the UWB radio may be granted access to the communication channel and/or shared antenna(s) at regular intervals, e.g., according to a UWB synchronization schedule. Upon completing the UWB communication, the UWB radio may surrender control of the communication channel and/or shared antenna(s). While the system is operating in the UWB-preferred sub-state 508, the Wi-Fi radio may be blocked from accessing to the communication channel and/ or shared antenna(s) while they are in use by the UWB radio, but may be granted access at other times. In some implementations, ongoing Wi-Fi communications may be interrupted by a request for the UWB radio to be granted access to the communication channel and/or shared antenna(s).

In some scenarios, operating in the UWB-preferred sub-state 508 may reduce the performance of Wi-Fi communications, relative to operating in the coexistence disabled state 504, e.g., because the Wi-Fi radio cannot gain access to the communication channel and/or shared antenna(s) if they are in use by the UWB radio. This may cause interruptions and/or delays in Wi-Fi communications. In some scenarios, the Wi-Fi radio may attempt to perform operations that cannot tolerate such reduced performance. Such operations may be referred to as critical operations. In some implementations, the system may transition from the UWB-preferred sub-state 508 to the Wi-Fi-recovery sub-state 510 in response to determining that the Wi-Fi radio is performing, or has scheduled or requested to perform, a critical operation. In some implementations, the system may transition from the Wi-Fi-recovery sub-state 510 to the UWB-preferred sub-state 508 in response to determining that the Wi-Fi radio is not performing, or has not scheduled or requested to perform, a critical operation.

In some implementations, certain operations may be known to be critical operations. For example, an operation that is known to have a low tolerance for latency, such as communicating data for Airplay™ or other video streaming applications, may be designated as a critical operation. The system may maintain a list of operations, types of operations, operational parameters, etc. that defines critical operations. In such implementations, the system may transition to the Wi-Fi-recovery sub-state 510 in response to determining that the Wi-Fi radio is communicating, or scheduling for communication, data according to such an operation. The system may transition to the UWB-preferred state 508 in response to determining that the Wi-Fi radio has concluded communicating data according to such an operation.

In some implementations, the system may determine whether the Wi-Fi radio is performing a critical operation based at least in part on performance of Wi-Fi communications, instead of, or in addition to, identifying known critical operations. For example, the system may determine that the Wi-Fi radio is performing a critical operation based on a determination that Wi-Fi communications have stalled, e.g., due to activity of the UWB radio.

FIG. 6 illustrates an example flow diagram of one method of determining whether Wi-Fi communications have stalled, according to some embodiments. In some implementations, the system may treat a determination that the Wi-Fi communications have stalled, e.g., according to the method of FIG. 6, as a determination that the Wi-Fi radio is performing a critical operation. The method illustrated in FIG. 6 may be implemented by any appropriate system, such as a wireless device, e.g., the wireless device 102, or some portion thereof, such as by an application processor (e.g., processor(s) 302) or the wireless communication circuitry 330 (e.g., the UWB Logic 332 and/or the WLAN/PAN Logic 336).

At 602, the system may determine whether Wi-Fi communications are performing at an acceptable level. For example, as illustrated, the system may determine whether a Wi-Fi data rate, such as a Wi-Fi receive rate, meets (or exceeds) a first threshold T1. The system may also, or alternatively, determine whether Wi-Fi latency remains below a second threshold T2. Other metrics may also, or alternatively, be used to determine whether the Wi-Fi communications are performing at an acceptable level. If the system determines that the Wi-Fi communications are performing at an acceptable level (e.g., if the Wi-Fi data rate meets T1 and the latency remains below T2), then the system may conclude that Wi-Fi communications have not stalled. Therefore, the system may perform no stall recovery actions (e.g., the system may determine that the Wi-Fi radio is not performing a critical operation, and the system may remain in the UWB-preferred sub-state). The method may therefore be terminated or begin again, e.g., to continue monitoring for a stall condition. In some implementations, the method may begin again after waiting a predetermined period of time, or after receiving a predetermined number of Wi-Fi packets following the determination at 602.

If the system determines that the Wi-Fi communications are not performing at an acceptable level (e.g., if the Wi-Fi data rate does not meet T1 or if the latency meets or exceeds T2), then the system may conclude that Wi-Fi communications have stalled, and may attempt to determine whether UWB communications are a likely cause of the stall. Specifically, in some scenarios, a Wi-Fi stall may be caused by various other conditions, unrelated to conflicts with the UWB radio, such as network congestion. In such cases, changing the coexistence sub-state would reduce UWB performance, but would be unlikely to improve Wi-Fi performance. Thus, changes to the coexistence sub-state should not be made until after verifying that UWB communications are a likely cause of the Wi-Fi stall.

FIG. 6 illustrates one example method for attempting to determine whether UWB communications are a likely cause of the stall, including 604 and 606. At 604, the system may determine whether the UWB duty cycle remains below a third threshold T3. If the system determines that the UWB duty cycle does remain below T3, then the system may conclude that UWB communications are occurring at a low enough rate that they are unlikely to be a significant cause of the stall. Therefore, the method may be terminated or begin again. In some scenarios, the system may determine that the Wi-Fi radio is not performing a critical operation, and the system may remain in the UWB-preferred sub-state.

If the system determines that the UWB duty cycle meets (or exceeds) T3, then the system may conclude that UWB communications are occurring at a high enough rate that they may be a cause (or significant contributor) of the stall, and may move on to 606. At 606, the system may determine whether a signal-to-noise ratio (SNR) or other signal quality metric of the Wi-Fi communications remains below a fourth threshold T4. If the system determines that the SNR remains below T4, then the system may conclude that the stall is being caused by poor signal quality, rather than by conflicts with the UWB radio. Therefore, the method may be terminated or begin again. In some scenarios, the system may determine that the Wi-Fi radio is not performing a critical operation, and the system may remain in the UWB-preferred sub-state.

If the system determines that the SNR meets (or exceeds) T4, then the system may conclude that the stall is not being caused by poor signal quality. The system may therefore further conclude that UWB communications are a likely cause of the stall. It should be understood that, in some implementations, different, or additional, tests may be performed to determine whether UWB communications are a likely cause of the stall. The tests illustrated at 604-506 are merely examples.

In response to determining that the Wi-Fi communications have stalled (e.g., at 602) and that UWB communications are a likely cause of (or contributor to) the stall, the system may determine that the Wi-Fi radio is performing a critical operation and/or transition to the Wi-Fi-recovery sub-state 510. Upon exiting the Wi-Fi-recovery sub-state 510 (e.g., upon transitioning back to the UWB-preferred sub-state 508), the system may begin the method of FIG. 6 again, e.g., immediately or after waiting a predetermined period of time or receiving a predetermined number of Wi-Fi packets.

FIG. 7 shows a timing diagram illustrating operational states of the system over time, while the system is operating in the Wi-Fi-recovery sub-state 510, according to some embodiments. As illustrated, while in the Wi-Fi-recovery sub-state 510, the system may perform a plurality of cycles of alternating grant periods. Specifically, a grant cycle may include one or more "remediation periods", during which the system may be configured in a manner intended to remedy poor performance by the Wi-Fi communications, and one or more "UWB maintenance periods", in which the system may be configured in a manner intended to maintain satisfactory UWB communications.

For example, during a remediation period, the system may deny the UWB radio access to the communication channel (e.g., to prevent UWB communications, or to constrain the UWB radio to use a different channel) and/or shared antenna(s) (e.g., to prevent UWB communications, or to constrain the UWB radio to use a different antenna). In some scenarios, the Wi-Fi radio may be given exclusive access to the communication channel and/or shared antenna(s) during this period. In other scenarios, the Wi-Fi radio may continue to contend with other RATs operating within the system, such as cellular (e.g., LTE, NR), BT, etc. In yet other scenarios, the system may allow UWB communications, but may allow the Wi-Fi radio to interrupt UWB communications.

Additionally, or alternatively, during the remediation period, the system may take other steps to attempt to remedy poor performance by the Wi-Fi communications. For example, during the remediation period, the system may bar Wi-Fi packet aggregation, e.g., as discussed above. As another example, the system may configure the Wi-Fi radio to receive Wi-Fi communications via the shared antenna and/or a dedicated Wi-Fi receive antenna concurrently with the UWB radio receiving UWB communications via the shared antenna and/or a dedicated UWB receive antenna. In such scenarios, the system may limit transmit power of Wi-Fi ACK messages, e.g., to avoid desense of the UWB radio.

During a UWB maintenance period, the system may suspend the remedial actions or configurations applied during the remediation period. For example, the system may allow UWB communications, e.g., by granting the UWB radio access to the communication channel and/or shared antenna(s). Thus, UWB communications may continue to operate periodically without the constraints of the remediation period. Specifically, a goal of the present system may be to allow Wi-Fi communications to recover while continuing to perform UWB communications at a sufficient level as to avoid significant detriment to the user experience. In some implementations, the system may operate during a UWB maintenance period in substantially the same manner as in the UWB-preferred sub-state 508. For example, during a UWB maintenance period, the system may allow the Wi-Fi radio to access the communication channel and/or shared antenna(s) while they are not in use by the UWB radio.

As outlined above, the grant cycles of the Wi-Fi-recovery sub-state 510 may provide increased opportunity to the Wi-Fi radio to access the communication channel and/or shared antenna(s), relative to operations in the UWB-preferred sub-state 508. Thus, operating within the Wi-Fi-recovery sub-state 510 may provide an opportunity to recover from the stall condition (or prevent a stall condition, if the system has determined in some other way that the Wi-Fi radio is performing a critical operation).

In some implementations, one or more of the remedial steps outlined above may be performed during both the remediation periods and the UWB maintenance periods. For example, barring Wi-Fi packet aggregation, limiting Wi-Fi ACK transmit power, and/or other steps may be performed throughout the Wi-Fi-recovery sub-state 510.

In some implementations, the system may determine that the Wi-Fi radio is no longer performing a critical operation, and/or transition from the Wi-Fi-recovery sub-state 510 to the UWB-preferred sub-state 508, by determining that exit criteria have been met. For example, such exit criteria may include determining that a Wi-Fi data rate, such as the Wi-Fi receive rate, meets (or exceeds) a fifth threshold T5. In some scenarios, T5 may be equal to T1. In other implementations, T5 may be different (e.g., higher) than T1. As another example, the exit criteria may include determining that one or more of the tests for transitioning to the Wi-Fi-recovery sub-state 510 (e.g., elements 602-606 of FIG. 6) are no longer met. E.g., in such implementations, the exit criteria may be met if any of elements 602-606 results in a "yes" branch. Other exit criteria may also, or alternatively, be used. It should be understood that the system may use any appropriate exit criteria that indicate that Wi-Fi communications have reached an acceptable level of performance and/or are likely to continue at an acceptable level upon the system transitioning to the UWB-preferred sub-state 508.

In some implementations, the system may test whether the exit conditions have been met on a frequent basis, such as during each of the remediation periods.

In some implementations, the system may test whether the exit conditions have been met less frequently. For example, the system may perform a predetermined number N of grant cycles (e.g., N=5, N=8, or N may be some other value), and may test whether the exit conditions have been met during the remediation period of the Nth cycle.

In some implementations, the system may temporarily enter a prolonged UWB maintenance period in response to determining that the exit conditions have not been met within a certain time period—e.g., by the Nth grant cycle. Specifically, if providing additional, uninterrupted communication time to the Wi-Fi radio during the remediation periods has not caused the Wi-Fi communications to recover within a predetermined period of time, that may indicate that the stall was caused by factors other than interruptions by the UWB radio. Furthermore, remaining in the Wi-Fi-recovery sub-state 510 for an extended period may cause degraded performance of the UWB communications. Therefore, in some implementations, the system may temporarily enter the prolonged UWB maintenance period in response to determining that the exit conditions have not been met by the Nth grant cycle. Following the prolonged UWB maintenance period, the system may resume normal operation according to the Wi-Fi-recovery sub-state 510, e.g., as illustrated in FIG. 7.

In some implementations, the remediation period may have the same duration as the UWB maintenance period (e.g., 30 ms, 60 ms, 120 ms). In other scenarios, the duration of the remediation period may be different than the duration of the UWB maintenance period. In some scenarios, the prolonged UWB maintenance period may be substantially longer than the normal UWB maintenance periods (e.g., 1 s, 2 s, 5 s). In some scenarios, the durations of the UWB maintenance period, the prolonged UWB maintenance period, and/or the remediation period may be variable. In some scenarios, additional, or different, values may be variable, such as the value of N, T1, T2, T3, T4, and/or T5. For example, in some implementations, one or more of these values may be adjusted during initial setup or testing, based on the particular characteristics of the hardware of the system. As another example, one or more of these values may be adjusted dynamically, e.g., based on real-time or long-term system performance measures, or based on other factors such as the type of critical operation being performed by the Wi-Fi radio, the type of data being sent by the Wi-Fi radio and/or the UWB radio, one or more applications being supported by the Wi-Fi radio and/or the UWB radio, etc. For example, a first set of values for one or more of the above variables may be known to perform well in improving performance when the Wi-Fi radio is performing a certain type of critical operation, such as streaming real-time video data; while a second, different set of values for the one or more of the above variables may be known to perform better in improving performance while the Wi-Fi radio is recovering from a stall condition. Therefore, the different sets of values may be applied in the appropriate scenarios.

It should be understood that the methods and illustrations of FIGS. 5-7 are merely examples, and numerous variations are possible. For example, although the preceding discussion is framed in terms of facilitating coexistence between UWB communications and Wi-Fi, some or all of the methods disclosed may additionally, or alternatively, be utilized to facilitate coexistence between other RATs.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a wireless device 102 or 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of operating a wireless communication device using a first radio access technology (RAT) and a second RAT, the method comprising:
by the wireless communication device:
determining that a first radio of the wireless communication device and a second radio of the wireless communication device are each configured to perform communications via a shared antenna of the wireless communication device, wherein the first radio is configured to perform communications according to the first RAT and the second radio is configured to perform communications according to the second RAT, wherein only one of the first radio or the second radio may perform communications via the shared antenna at one time;
determining that communications according to the first RAT fail to meet predetermined performance criteria;
determining that one or more metrics indicate that communications according to the second RAT are contributing to the failure of the communications according to the first RAT to meet the predetermined performance criteria; and
in response to determining that the one or more metrics indicate that communications according to the second RAT are contributing to the failure of the communications according to the first RAT to meet predetermined performance criteria, preventing communications according to the second RAT during one or more periods of time.

2. The method of claim 1, wherein preventing the communications according to the second RAT for one or more periods of time comprises implementing a plurality of remediation periods, during which communications according to the second RAT are prevented, wherein a remediation period is followed by a UWB maintenance period, during which communications according to the second RAT are allowed.

3. The method of claim 1, wherein determining that communications according to the first RAT fail to meet predetermined performance criteria comprises at least one of:

determining that a data rate of the communications according to the first RAT fails to meet a first performance threshold; or
determining that a latency metric of the communications according to the first RAT meets a second performance threshold.

4. The method of claim 1, wherein determining that one or more metrics indicate that communications according to the second RAT are contributing to the failure of the communications according to the first RAT to meet predetermined performance criteria comprises:
determining that a duty cycle of the communications according to the second RAT meets a third performance threshold; and
determining that a signal quality metric of the communications according to the first RAT meets a fourth performance threshold.

5. The method of claim 1, further comprising:
in response to determining that the first radio of the wireless communication device and the second radio of the wireless communication device are each configured to perform communications via the shared antenna, disabling packet aggregation by the first radio.

6. The method of claim 1, further comprising:
in response to determining that the first radio of the wireless communication device and the second radio of the wireless communication device are each configured to perform communications via the shared antenna, disabling an OFDMA uplink mode of the first radio.

7. A wireless communication device, comprising:
a first radio, configured to communicate according to a first radio access technology (RAT);
a second radio, configured to communicate according to a second RAT;
at least one processor configured to cause the wireless communication device to:
determine that the first radio and the second radio are each configured to perform communications within a shared frequency range;
determine that communications according to the first RAT fail to meet a predetermined performance criterion;
determine that one or more metrics indicate that communications according to the second RAT are contributing to the failure of the communications according to the first RAT to meet the predetermined performance criteria;
in response to determining that the one or more metrics indicate that communications according to the second RAT are contributing to the failure of the communications according to the first RAT to meet predetermined performance criteria, prevent communications according to the second RAT during one or more periods of time; and
in response to determining that the one or more metrics do not indicate that communications according to the second RAT are contributing to the failure of the communications according to the first RAT to meet predetermined performance criteria, prioritize one or more communications according to the first RAT over one or more communications according to the second RAT.

8. The wireless communication device of claim 7, wherein preventing the communications according to the second RAT for one or more periods of time comprises implementing a plurality of block periods, during which communications according to the second RAT are prevented, wherein a block period is followed by a grant period, during which communications according to the second RAT are allowed.

9. The wireless communication device of claim 7, wherein determining that communications according to the first RAT fail to meet the predetermined performance criterion comprises at least one of:
   determining that a data rate of the communications according to the first RAT fails to meet a first performance threshold; or
   determining that a latency metric of the communications according to the first RAT meets a second performance threshold.

10. The wireless communication device of claim 7, wherein determining that one or more metrics indicate that communications according to the second RAT are contributing to the failure of the communications according to the first RAT to meet the predetermined performance criterion comprises:
   determining that a duty cycle of the communications according to the second RAT meets a third performance threshold; and
   determining that a signal quality metric of the communications according to the first RAT meets a fourth performance threshold.

11. The wireless communication device of claim 7, wherein the at least one processor is configured to cause the wireless communication device to:
   in response to determining that the first radio of the wireless communication device and the second radio of the wireless communication device are each configured to perform communications within the shared frequency range, perform at least one of:
      disabling packet aggregation by the first radio; or
      disabling an OFDMA uplink mode of the first radio.

12. An apparatus comprised in a wireless communication device, the apparatus comprising:
   a memory storing software instructions; and
   a processor configured to execute the software instructions to:
      cause the wireless communication device to perform communications according to a first radio access technology (RAT) and a second RAT via a shared antenna of the wireless communication device, wherein the wireless communication device may perform communications according to only one of the first RAT or the second RAT via the shared antenna at one time;
      determine that communications according to the first RAT fail to meet predetermined performance criteria;
      determine that one or more metrics indicate that communications according to the second RAT are contributing to the failure of the communications according to the first RAT to meet the predetermined performance criteria; and
      in response to determining that the one or more metrics indicate that communications according to the second RAT are contributing to the failure of the communications according to the first RAT to meet the predetermined performance criteria, prevent communications according to the second RAT during one or more periods of time.

13. The apparatus of claim 12, wherein preventing the communications according to the second RAT for one or more periods of time comprises implementing a plurality of remediation periods, during which communications according to the second RAT are prevented, wherein a remediation period is followed by an ultra wideband (UWB) maintenance period, during which communications according to the second RAT are allowed.

14. The apparatus of claim 12, wherein determining that communications according to the first RAT fail to meet predetermined performance criteria comprises at least one of:
   determining that a data rate of the communications according to the first RAT fails to meet a first performance threshold; or
   determining that a latency metric of the communications according to the first RAT meets a second performance threshold.

15. The apparatus of claim 12, wherein determining that one or more metrics indicate that communications according to the second RAT are contributing to the failure of the communications according to the first RAT to meet predetermined performance criteria comprises:
   determining that a duty cycle of the communications according to the second RAT meets a third performance threshold; and
   determining that a signal quality metric of the communications according to the first RAT meets a fourth performance threshold.

16. The apparatus of claim 12, wherein the processor is further configured to execute the software instructions to:
   while causing the wireless communication device to perform communications according to the first RAT and the second RAT via the shared antenna, disabling packet aggregation by the first RAT.

17. The apparatus of claim 12, wherein the processor is further configured to execute the software instructions to:
   while causing the wireless communication device to perform communications according to the first RAT and the second RAT via the shared antenna, disabling an OFDMA uplink mode of the first RAT.

18. The apparatus of claim 12, wherein preventing communications according to the second RAT during one or more periods of time comprises alternating between periods during which communications according to the second RAT may be performed via the shared antenna and periods during which communications according to the second RAT may not be performed via the shared antenna.

19. The apparatus of claim 12, wherein the processor is further configured to execute the software instructions to:
   in response to determining that the one or more metrics do not indicate that communications according to the second RAT are contributing to the failure of the communications according to the first RAT to meet the predetermined performance criteria, prioritize one or more communications according to the first RAT over one or more communications according to the second RAT.

20. The apparatus of claim 19, wherein prioritizing one or more communications according to the first RAT comprises allowing communications according to the first RAT to interrupt communications according to the second RAT.

* * * * *